NON-ADJUSTED LENGTH EQUIVELANT TO FULL CLUTCH FACING

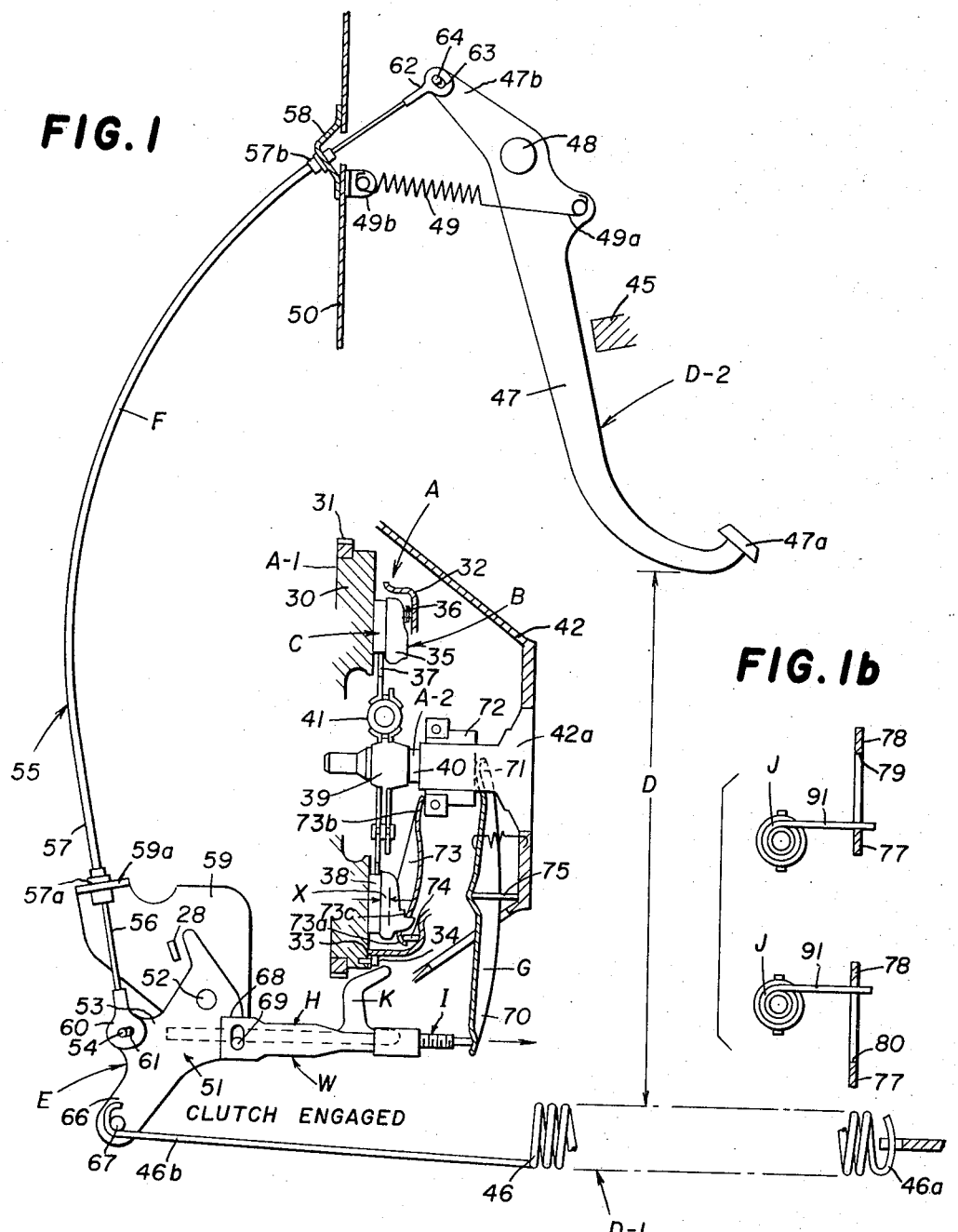
FIG. 1
FIG. 1b
FIG. 1a
CLUTCH ENGAGED
CLUTCH RELEASED
INVENTORS
RICHARD L. SMIRL
ROBERT J. RYBA
BY 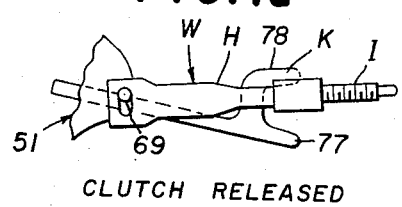
ATTY.

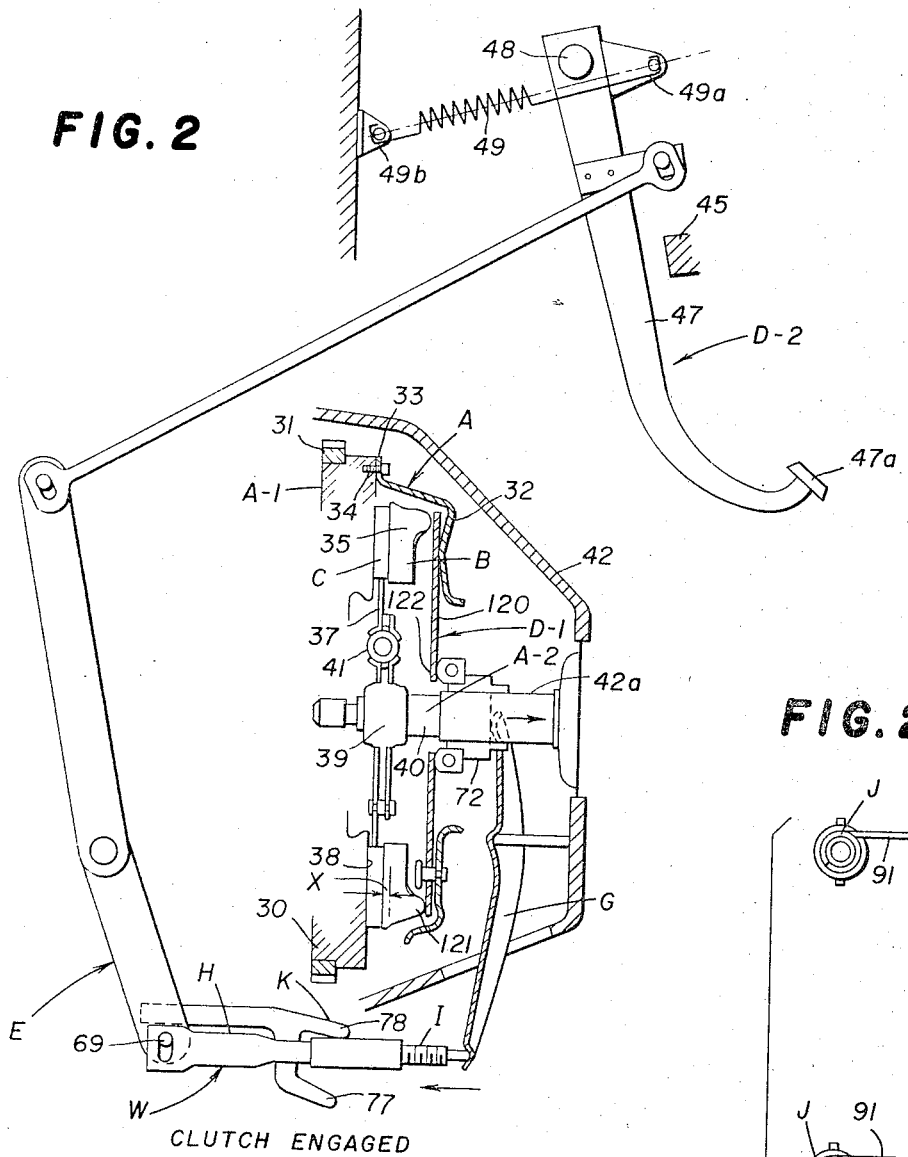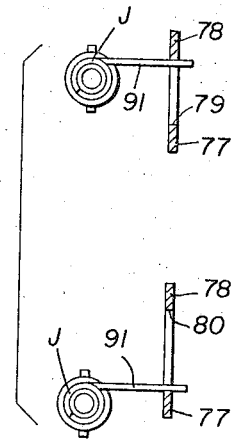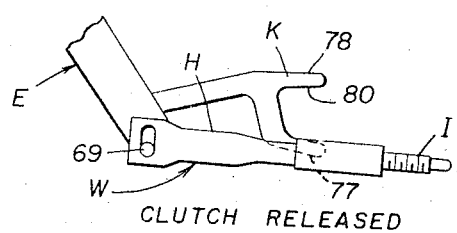

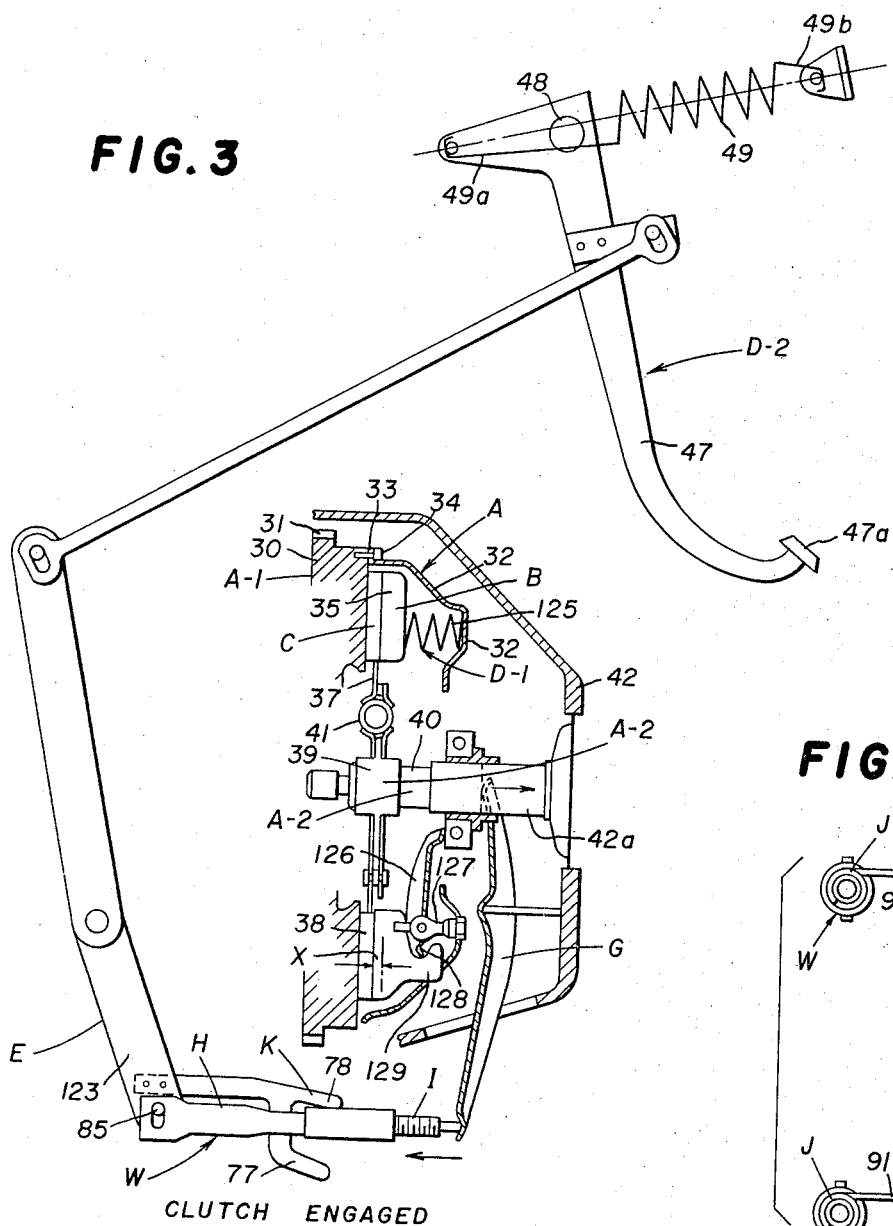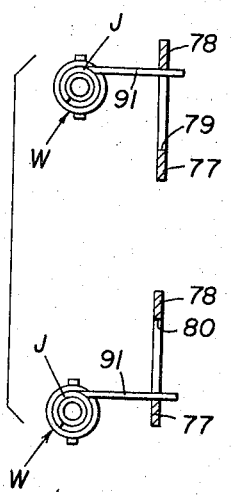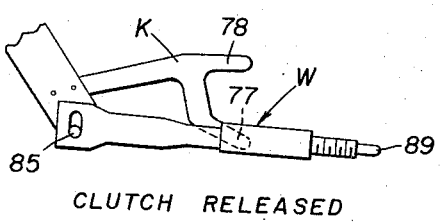

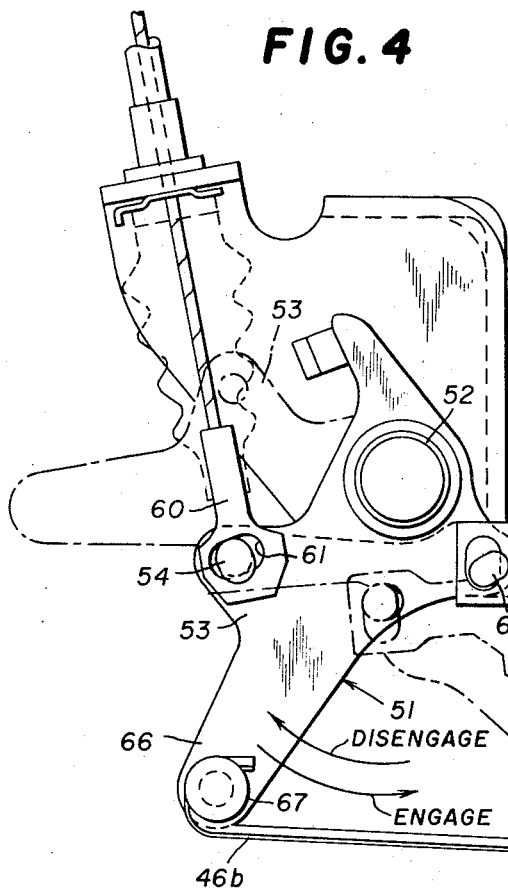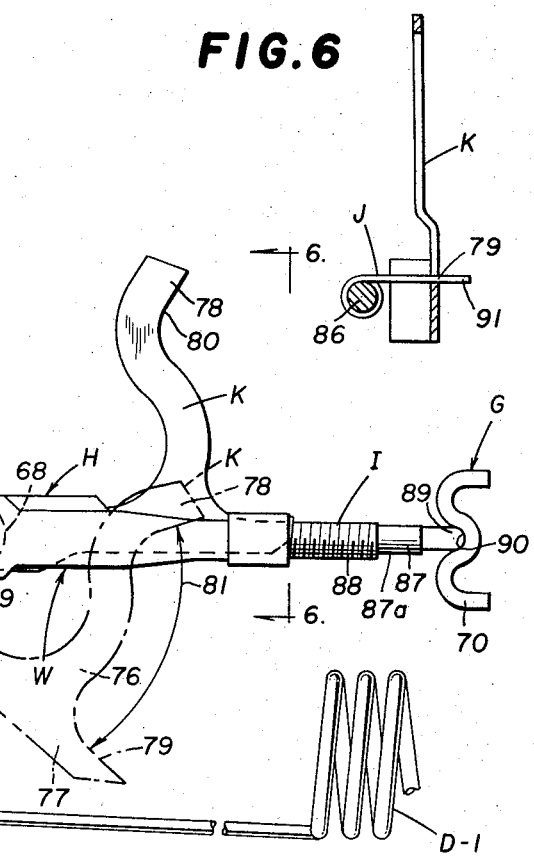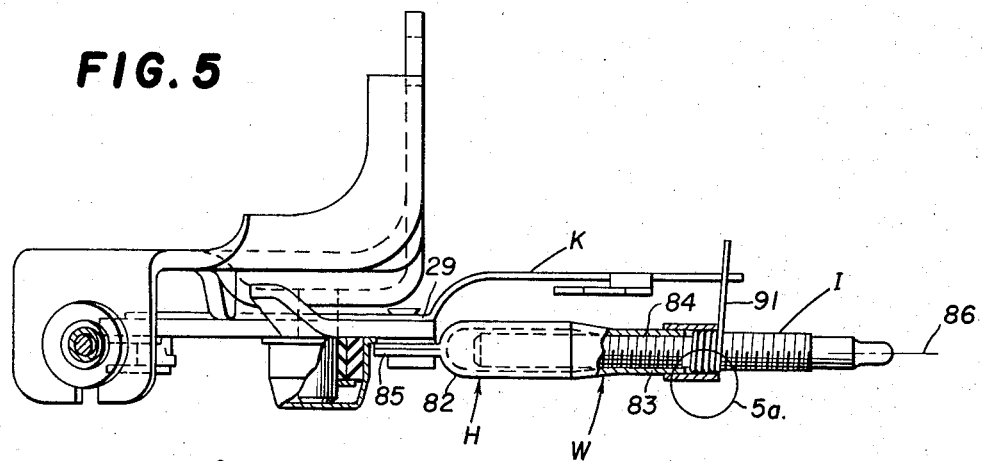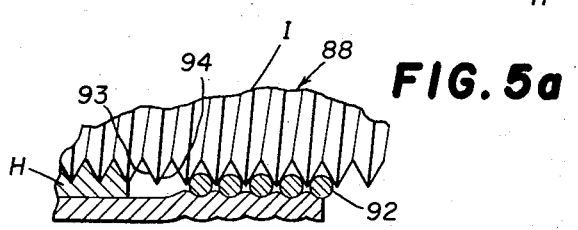

LENGTH AFTER FULL ADJUSTMENT EQUIVELANT TO FULLY WORN FACING

Jan. 23, 1968   R. L. SMIRL ET AL   3,365,042
FRICTION DEVICE EMPLOYING WEAR COMPENSATING MEANS
Filed Aug. 12, 1964   9 Sheets-Sheet 6

NON-ADJUSTED LENGTH EQUIVELANT TO FULL CLUTCH FACING

LENGTH AFTER FULL ADJUSTMENT EQUIVELANT TO FULLY WORN FACING

INVENTORS
RICHARD L. SMIRL
ROBERT J. RYBA
BY
Joseph W. Mallech
ATTY.

Jan. 23, 1968  R. L. SMIRL ETAL  3,365,042
FRICTION DEVICE EMPLOYING WEAR COMPENSATING MEANS
Filed Aug. 12, 1964  9 Sheets-Sheet 7

INVENTORS
RICHARD L. SMIRL
ROBERT J. RYBA
BY
Joseph W. Mallech
ATTY.

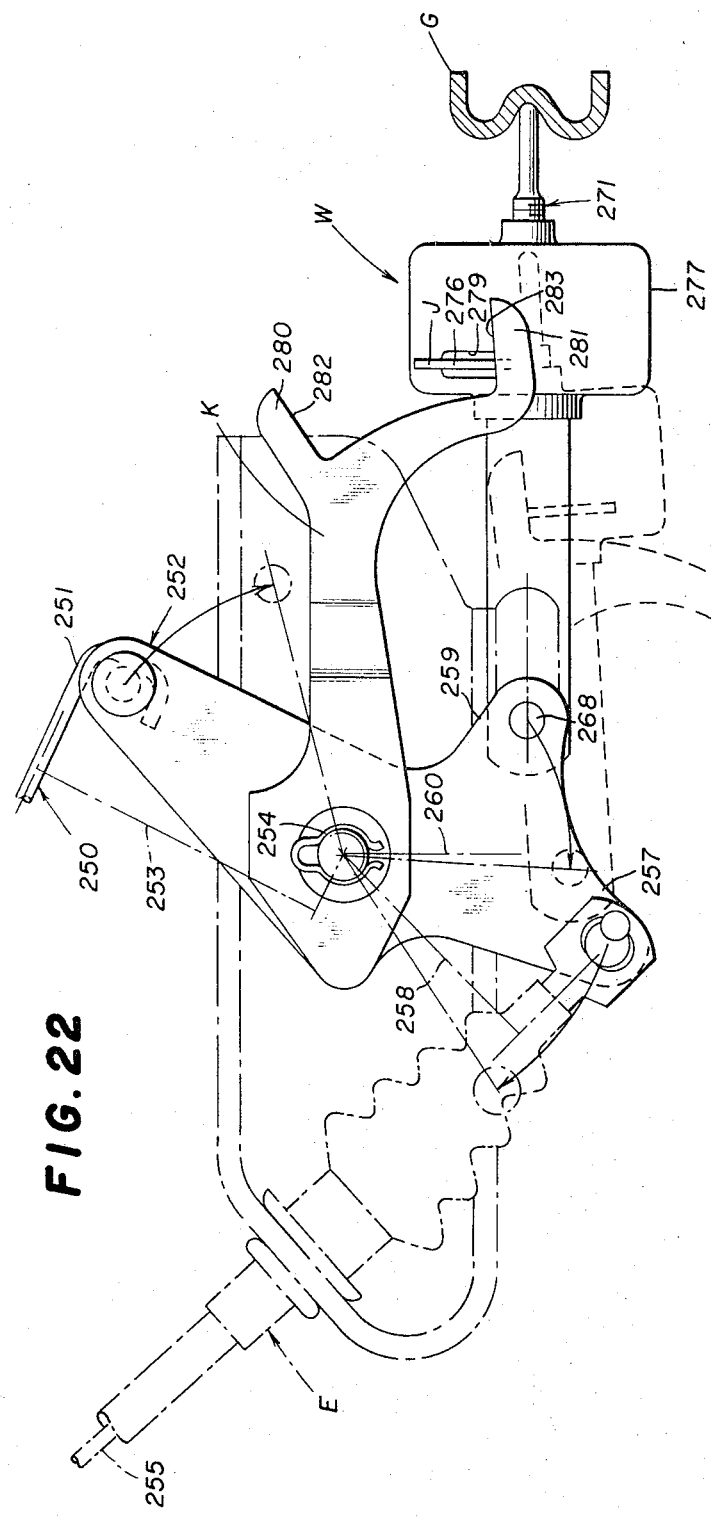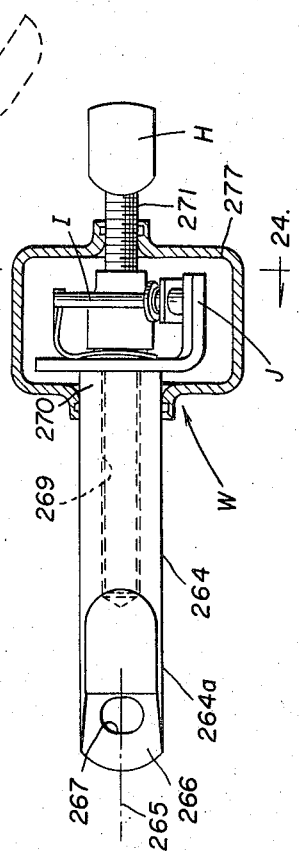
INVENTORS
RICHARD L. SMIRL
ROBERT J. RYBA
BY Joseph W. Malleck
ATTY.

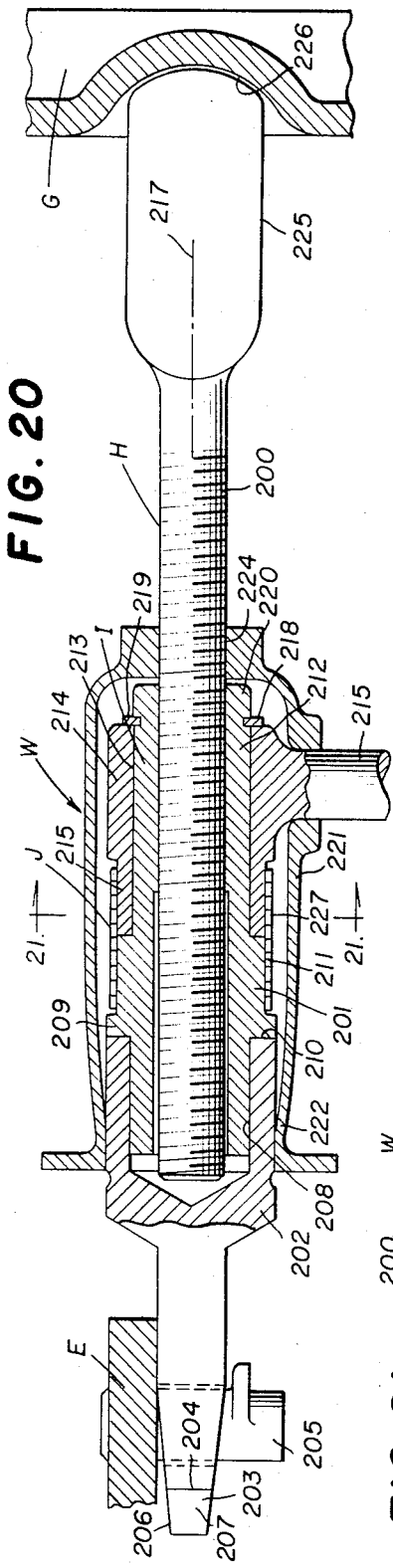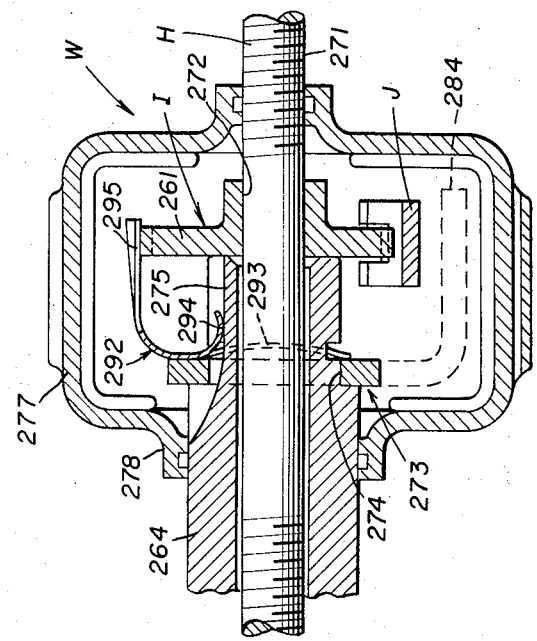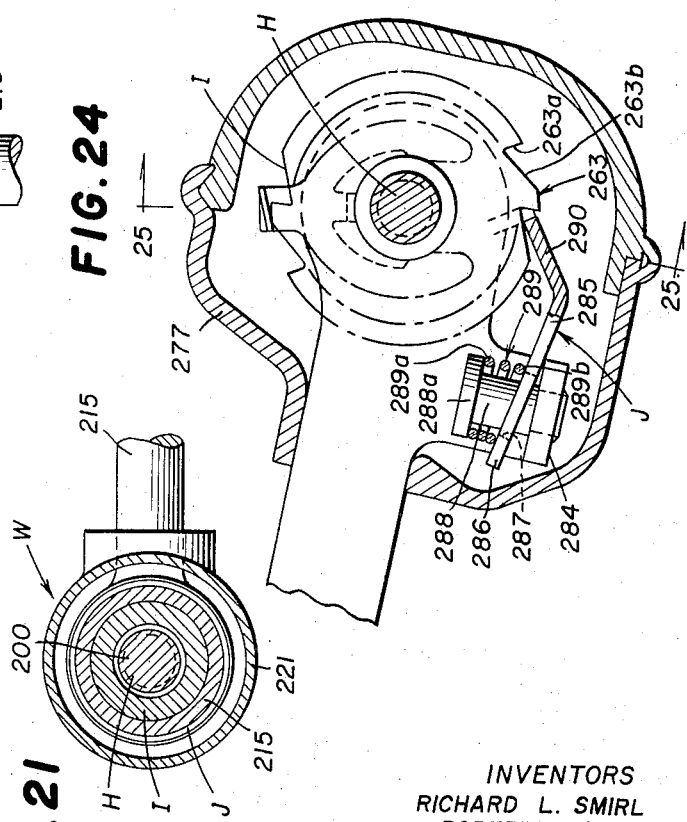

United States Patent Office 3,365,042
Patented Jan. 23, 1968

3,365,042
**FRICTION DEVICE EMPLOYING WEAR
COMPENSATING MEANS**
Richard L. Smirl, La Grange Park, and Robert J. Ryba,
Lyons, Ill., assignors to Borg-Warner Corporation, Chicago, Ill., a corporation of Illinois
Filed Aug. 12, 1964, Ser. No. 389,018
29 Claims. (Cl. 192—111)

This invention relates to a control linkage for friction devices and particularly to a control linkage employing unique wear compensating means.

In most automotive applications, clutches are traditionally manually adjusted at specific periods for slack resulting from wear of the friction faces. Although various automatic wear compensating means have been contrived to serve the automotive clutch market, these devices have proved to be expensive, complicated, undependable and specifically engineered for a limited type of clutch construction.

Therefore, it is a primary object of this invention to provide improved automatic wear compensating means which adds new advantages to any linkage system controlling a friction device, the compensating means being particularly characterized by simplicity and durability to outlast the normal operating life of the friction device. Structural features pursuant to this object include the definition of a wear compensating means of three elementary members; two relatively moveable coaxial members and a one-way device or friction drive effective to advance the members relative to each other as excessive travel of the operating linkage is experienced. The one-way or friction drive device may take several forms, a preferred embodiment comprising a helically wound wire effective to provide a driving connection between the coaxial members when turned in one direction and effective to release the connection between the members when rotated in an opposite direction; other embodiments may take the form of a stepped coupling wherein a ratchet wheel cooperates with a priming means for advancing one member relative to the other in stepped increments or the coaxial members may be independent of a driven stud and have coaxially aligned drum surfaces upon which is mounted a helical band effective to provide a driving connection when one of the members is rotated in one direction and a slip of such connection when rotated in an opposite direction.

Another object of this invention is to provide a clutch control linkage employing improved wear compensating means which for the first time provides two simultaneous advantages when added to any clutch system: (a) reduction of pedal effort, and (b) automatically maintains a uniform pedal stroke with a constant starting position. A structural feature pursuant to this object is the reversal of operation of the spring conventionally used to hold the clutch pedal in a raised position within the vehicle; in this invention the spring is caused to function oppositely to hold the clutch pedal with a downward bias. The downward bias of the clutch pedal spring eliminates the normal backlash experienced in known clutch structures to date and provides a generally "solid" linkage between the clutch pedal and the clutch device whereby infinite increments of wear in the pedal stroke can be sensed and compensated. In reversing the operation of the pedal spring, the spring force normally working against the operator, as well as the linkage geometry which adds to the force working against the operator, has been eliminated and permits the pedal spring to assist the operator in the clutch disengaging operation for reducing pedal effort.

Another object of this invention is to provide a linkage system for a friction device employing wear compensating means which eliminates the human element in the initial assemblage and setting of the linkage system while manufacturing the vehicle. The system of this invention is designed so that the mere pumping of the clutch pedal a few times will bring the linkage system into proper adjustment for the specific clutch with which it is used thereby obviating the need for calibration and delicate linkage settings now customarily used in the setting of convention clutches.

Still another object of this invention is to provide a linkage system for a friction device having wear compensating means which is not only versatile but truly universal in application in that it can be used with generally all clutch systems known to date. As characterized in the preferred embodiment disclosed herein, the wear compensating means uniquely employs the normal clutch engaging force to maintain coaxial members thereof fixed against relative movement while permitting a one-way adjusting device to be primed for sensing increments of wear; upon the disengaging stroke of the pedal with the engaging force relieved, the coaxial members are rotatively adjusted to accommodate the precise increment of wear. The structure of the preferred embodiment is also reversible and capable of being reset to its original condition to permit it to be reused in reconditioned devices without complex removal procedures and expensive installation time.

Another object of this invention is to provide improved wear compensating means which incorporates unique safety features to promote fool-proof clutch operation. Such features comprise (a) the calibration of the length of threads on the coaxial members to be commensurate with the distance traversed by full facing wear; the one-way device, as said threads are exhausted by full adjustment, slip in both rotative directions to prevent excessive adjustments beyond the capabilities of the wear compensating means, (b) the employment of threaded surfaces for directly carrying the one-way friction device, the threaded surfaces serving as wedges to augment the gripping force of the one-way device, and (c) the optional use of a positive pedal stop slightly spaced from the clutch pedal during the normally engaged condition of the clutch, said pedal stop being solely used to prevent inadvertent snap action of the clutch pedal when the operator's foot slips off the pedal too quickly.

Another object of this invention is to provide improved wear compensating means which has greater freedom from contamination and dirt destruction than known devices. Structural features pursuant to this object comprise the employment of a shinkable sleeve effective to hug the contours of the one-way device and coaxial members while permitting operative movement of said elements, or the employment of dipped molded boots to enclose the working surfaces.

Yet another object of this invention is to provide a wear compensating means for a clutch linkage system which is characterized by greater economy resulting from an unprecedented minimum of parts and use of stock materials, as well as a unique method of manufacture of certain elements of said means.

And yet another object of this invention is to provide an improvement to the clutch control system disclosed in U.S. patent application S.N. 312,029, assigned to the assignee of this invention, which uniquely adds the advantage of wear compensation, although not a necessity, to such system. In this system, reaction forces from the clutching means (referring to the interengageable friction elements and respective mountings), a remotely disposed spring providing the clutch-engaging force, and the manual release means (such as a foot pedal and its connection) are all commonly connected to a rocker plate having a distinctive configuration. The distinctive configuration is designed so that predetermined moment arms of each of said reaction forces about the rocker plate pivot are regulated to provide an unprecedented comfort of clutch actuation. Flexible linkage is utilized in this system to provide greater versatility and adaptation to the vehicle upon which this system is used. Continued comfort of clutch actuation is assured by the employment of the automatic wear compensating means of this invention which maintains geometrical relationship of the elements in unprecedented true relationship without sacrificing ruggedness or dependability of the system.

Other objects and advantages of this invention will become apparent from the following detailed description taken in connection with the accompanying drawings in which:

FIGURE 1 is an elevational view, partly schematic, of a clutch system employing a remote spring type clutch and wear adjusting means embodying the principles of this invention, said system being shown in the clutch-engaged condition;

FIGURE 1a is a view of a portion of FIGURE 1 including the wear adjusting means and illustrating such portion in the clutch released condition;

FIGURE 1b is a composite of end elevational views of the structure shown in FIGURE 1a illustrating the condition of such structure in both the clutch engaged and in the clutch disengaged conditions;

FIGURE 2 is an elevational view of a clutch system partly schematic, employing a Belleville type clutch actuator and a wear compensating means embodying the principles of this invention, said system being shown in the clutch-engaged condition;

FIGURE 2a is a view of a portion of FIGURE 2 including the wear compensating means and illustrating such structure in the clutch-released condition;

FIGURE 2b is a composite of end views of the structure of FIGURE 2a shown both in the clutch-engaged and the clutch-released conditions;

FIGURE 3 is an elevational view of a clutch system, partly schematic, employing a conventional internal coiled-spring actuator and a wear compensating means embodying the principles herein, said clutch system being shown in the clutch-engaged condition;

FIGURE 3a is a view of a portion of the structure of FIGURE 3 and including the wear compensating means, said structure being shown in the clutch-released condition;

FIGURE 3b is a composite of end views of the structure of FIGURE 3a, showing both the clutch-engaged and clutch-released conditions;

FIGURE 4 is an enlarged illustration of a portion of the structure of FIGURE 1 illustrating the rocker plate and wear compensating means as connected with the clutch fork, said structure being shown in both the engaged and clutch-disengaged conditions;

FIGURE 5 is a top illustration of the structure shown in FIGURE 4 and having portions thereof broken away to illustrate fragmentary sections;

FIGURE 5a is a greatly enlarged portion of the structure circled in FIGURE 5;

FIGURE 6 is a view taken substantially along line 6—6 of FIGURE 4;

FIGURE 20 is a greatly enlarged central sectional view of an alternative wear-compensating means depicted with connecting clutch linkage;

FIGURE 21 is a sectional view taken substantially along line 21—21 of FIGURE 20;

FIGURE 22 is a fragmentary portion of a clutch system employing still another embodiment of the wear-compensating means of FIGURE 4 showing the structure in both the clutch-engaged and clutch-disengaged conditions;

FIGURE 23 is a sectional view of the wear-compensating means of FIGURE 22;

FIGURE 24 is a greatly enlarged sectional view taken substantially along line 24—24 of FIGURE 23; and FIGURE 25 is an enlarged sectional view taken substantially along line 25—25 of FIGURE 24.

Figure 7:
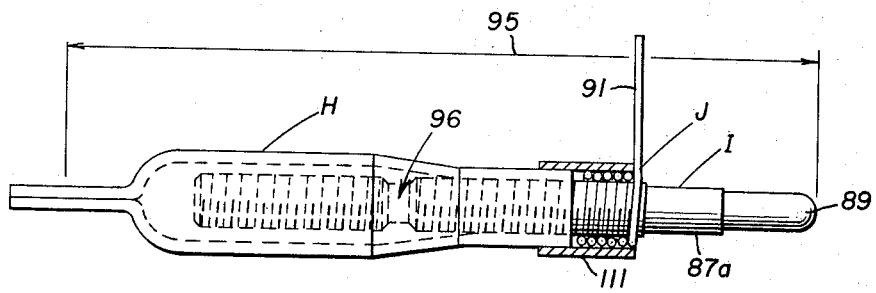
FIGURE 7 is a greatly enlarged illustration of the thrust rod employing an expansible type wear compensating means of FIGURE 5 and showing the structure in the non-adjusted initial condition.

Turning now to the drawings, there is illustrated in FIGURES 1, 2 and 3 various alternative clutching systems employing the principles of this invention, each system in its broad aspects comprising a friction or clutching means A which includes rotative input means A-1 and rotative output means A-2, and inter-engageable friction elements broadly designated B and C each respectively connected with said input and output means and adapted to be moved through a predetermined distance "X" for providing complete inter-engagement and promoting rotative drive therebetween. Actuator means D includes an engaging means D-1 normally providing an engaging force and disengaging means D-2 selectively providing a disengaging force, both of said engaging and disengaging means being reciprocably movable through strokes having a distance which is responsive to the distance necessary to promote complete inter-engagement of said friction elements. Mechanical linkage E is employed to interconnect said actuator, or in some embodiments, the disengaging means, with the friction means A. In most cases, the mechanical linkage is characterized by an operating lever or fork G extending into the friction device housing.

Interposed in the mechanical linkage is novel wear compensating means W particularly comprising coaxial inter-screwed members H and I, one normally held against rotation about the common axis and the other effective to be rotated in response to a degree of wear for driving said members relative to each other. Said compensating means further comprises a friction drive means J effective to sense a change in the stroke of said actuator by aid of an actuating arm K movable with said linkage and thereby adjust said members relative to each other.

Turning now to FIGURES 1, 1a and 1b for the preferred embodiment and more particularly to the friction means A, the input means A–1 comprises an annular flywheel 30, of the pot type, carrying an annular ring of teeth 31 appropriate for starting purposes and is normally coupled to an engine shaft (not shown). A stamped sheet metal cover plate 32 is employed to enclose clutching structure and is attached to the flywheel at circumferentially spaced lips 33 by suitable fasteners such as cap screws 34. An annular high-carbon steel pressure plate 35 is drivingly connected to the cover plate by a plurality of tangentially disposed straps 36, said straps having an offset relaxed condition effective to urge and retract the pressure plate toward the cover plate when other engaging forces are overcome.

The output means A–2 comprises a conventional driven friction disc 37 having annular rings of friction material 38 at the outer periphery thereof and a hub 39 having internal splines inter-engaging with a splined driven shaft 40 journalling said disc; a vibration dampener 41 of a typical construction is employed.

The pressure plate, in the several embodiments disclosed herein, is actuated in the axial direction toward the friction disc 37 and effective to clamp said friction disc therebetween in cooperation with the flywheel for promoting conjoint rotation; however, this invention may include clutching or friction structures wherein interengagement of friction elements may be varied from this arrangement. The pressure plate herein, is designed to travel a predetermined distance "X" to provide complete inter-engagement of the friction elements before wear has occurred. Distance "X" will increase as increments of wear are experienced. A housing 42 is adapted to surround said friction means A carrying sleeve portion 42a for journalling said output shaft 40; said housing is rigidly supported. Fuller details of the friction means A of the embodiment may be gained by reference to U.S. application S.N. 163,629 which is incorporated herein by reference.

Engaging means D–1 is provided to apply an engaging force to the pressure plate 35 and comprises a remotely disposed coiled tension spring 46 having one end 46a connected to a fixed member and another end 46b connected to the linkage E, which in this embodiment, connects said engaging means with the pressure plate 35.

The disengaging means D–2 comprises a pivotal lever 47 (which is the conventional foot pedal) having one end 47a adapted for receiving a manual force and an opposite end 47b connected with said linkage E. The lever 47 has a pivot 48 and a hold-down spring 49 normally urging said lever downwardly (which is in direct contrast to the conventional method of biasing the foot pedal). The spring thereby normally biases the lever 47 in a direction which would tend to disengage the friction elements of the clutch; to this end, spring 49 has one end 49a connected to the lever and to one side of the pivot opposite from that at which the linkage is connected, and another end 49b of the spring is connected to a fixed portion such as firewall 50 of the vehicle. A stop 45 may be employed, normally spaced from the lever 47 in the clutch engaged condition, providing a safety feature in that the quick snapping of the foot from the pedal may at times permit the lever to bounce higher than usual.

The linkage means E for the preferred embodiment (apart from the hold-down spring 49, fuller details of the linkage means E beyond that described below may be had by reference to U.S. application S.N. 312,029 which is incorporated herein by reference) employs a rocker plate 51 which is pivotally mounted on a fixture by journal assembly 52 and adapted to rotate in the plane parallel to the plate 51. The rocker plate is unique in that it is adapted to form a common interconnection of the manual disengaging means D–2, the remote engaging force means D–1 and the friction A. Such common interconnecting rocker plate enables the clutching forces to be interrelated more accurately and more precisely varied during the clutching stroke. The rocker plate 51 has one portion or hand 53 carrying a pin 54 effective to receive and connect with flexible linkage 55 which serves to link the rocker plate with the end 47b of the lever 47. Flexible linkage 55 comprises a wire strand 56 adapted for axial movement within a casing 57, the casing having one end 57a connected to a flange 59a of the fixture 59 and an opposite end 57b connected to a bracket 58 attached to the firewall 50; each end of the strand 56 respectively has a connector 60 and 62 each provided with a D-shaped opening 61 and 63 respectively, each opening having an elongated straight side or edge against which the respective pins 54 and 64 may rollingly engage. The D-shaped opening and pin combinations, provide an anti-friction connection; the anti-friction connection is also further aided by a dimple which is formed into the connector causing it to protrude from the plane of the connector and thereby tend to localize the side contact between the connector and the rocker plate serving to localize friction to substantially a point and thereby obviating a normal scrubbing action.

Another hand or portion 66 of the rocker plate 51 carries a pin 67 received by the hooked portion 46b of engaging spring 46.

A third hand or portion 68 of the rocker plate 51 carries a pin 69 interconnected with the wear adjusting means W which is interposed within the linkage leading to the friction means A. Completing the linkage means from the hand 68 to the friction means A, is the operating fork or lever G fulcrumed on strut 75 and having one end 71 inter-engaged with a thrust bearing assembly 72 mountable on the portion 42a of the housing 42. A plurality of internal levers 73 are provided having one end 73a fulcrumed upon a strut 74 extending between the levers 73 and the cover plate 32. The inner ends 73b of the lever 73 inter-engages with the other side of the bearing assembly 72. An intermediate portion 73c of the internal levers engage a flat surface of the pressure plate 35; the levers 73 are equi-circumferentially spaced within the housing 42. Both the operating fork or lever G and the internal lever 73 are characterized by rolling contacts throughout.

The rocker plate 51, as illustrated in FIGURE 4, is pivoted counter-clockwise (under the force of the engaging means D–1) an arcuate distance adequate to move said lever G and internal levers 73 a sufficient degree to promote complete interengagement of the pressure plate 35 with the friction disc 37 and the flywheel 30. The rocker plate 51 is pivoted clockwise (under the influence of the disengaging means D–2 overcoming the means D–1) to retract said member I, permitting said straps 36 to urge the lever G, levers 73 and pressure plate to a predetermined disengaged position. A non-slack connection is maintained between the rocker plate and levers 73 by virtue of the hold-down spring 49 urging the flexible linkage to follow closely or heel the pivotal movements of the rocker plate. The counter clockwise movement of the rocker plate may be considered a forward stroke of the linkage and the clockwise arcuate movement may be considered the return stroke of the linkage, both strokes being predetermined for a newly assembled device before wear has occurred.

To compensate for wear, changes in the forward or return strokes of said rocker plate are transmitted to the wear adjuster device W by the actuating arm K which is formed with one end 29 fastened to a portion of the rocker plate and an oppositely extending portion 76 offset from the plane of the rocker plate and carrying circumferentially spaced ears 77 and 78 as viewed with respect to the pivot of the rocker plate. Each of the ears has a generally radially directed edge or surface 79 and 80 respectively and the spacing 81 therebetween is predetermined to be proportionate to the predetermined arcuate travel of the rocker plate.

Upon the occurrence of any finite degree of wear, the ears are adapted to sequentially contact and energize the wear adjuster W in the forward and return strokes of the linkage which will expand said linkage and return said arcuate movement of the rocker plate to its predetermined situation.

The wear compensating means of the preferred embodiment, as illustrated more fully in FIGURES 4-5, comprises coaxial inter-screwed members H and I adapted to be axially adjusted for expanding the distance between the end 70 of the fork G and the pin 69 on the rocker plate to compensate for increments of wear. The member H comprises a socket body 82 threaded with a reduced neck portion 83 having continuous helical internal threads 84 provided therein; the body is adapted to be held against rotation by virtue of a connecting flange 85 having a flat disposition generally parallel to the plane of rotation of the rocker plate and which receives the cylindrical pin 69 extending transversely therethrough to limit any degree of rotation about the common axis 86 of the members H and I.

The advanceable member I comprises a shank 87 having threads 88 formed on the exterior surface 87a thereof which extends substantially throughout the longitudinal length thereof; the member I has a rounded nose or stud portion 89 formed at one end thereof adapted to nest within a pocket 90 on the lever end 70. The nose 89 is generally semi-spherical in configuration to rotate within the pocket while adjusting.

The friction drive means J, of the preferred embodiment, takes the form of a one-way operating helical spring 92 having a single continuous strand coiled in a fashion to fit within the threads 88 of the advanceable member I. The spring is wound in the same direction as the threads are formed and has a terminal portion or finger 91 extending transversely outwardly with respect to the common axis 86 of the members H and I. Terminal portion 91 in FIGURE 6, is directed tangentially from the coiled configuration of the spring. The direction of winding of the spring is adapted so that downward arcuate movement (which would be into the plane of the drawing as viewed in FIGURE 5) causes the spring to wind more tightly and lock on the outer periphery (in this embodiment the periphery is defined by threads) of the advanceable member I and cause the member I to turn therewith. Energization or arcuate movement of the terminal portion 91 out of the plane of the paper as viewed in FIGURE 5 causes the spring to uncoil slightly and thereby slip about the advanceable member I.

FIGURE 5a illustrates the additional cooperation that the threads 88 provide in augmenting the driving force of the coiled spring 92 when energized to lock with the advanceable member I. Each of the threads is formed by converging surfaces 93 and 94 which are continuous and helically formed; adjacent surfaces of adjacent threads are effective to receive one portion of the strand of the spring 92 and define a radially inwardly directed wedge which augments the locking action of the spring when more tightly wound thereabout.

In operation, and assuming a first increment of wear has occurred, the arm K will be pivoted arcuately in a counterclockwise direction as viewed in FIGURE 4 bringing the surface or edge 79 in contact with the finger 91 of the spring (see FIGURE 6) and tending to turn the finger in a counter-clockwise direction as viewed in FIGURE 6. This energization of the spring tends to proportionately slip or rotate the spring about the advanceable member I since the engaging force, as transmitted through the coaxial members, will prevent the member I from rotating about its own axis 86. This excess movement of the arm K is due to the fact that the rocker plate must be rotated further to provide extra movement of the levers 73 for permitting the pressure plate 35 to take up the slack as created by the wear.

Upon the subsequent disengagement of the clutch, by selective manual operation of the lever 47, the arm K will be urged in a clockwise direction (FIGURE 4) to return to a uniform retracted position as limited by the downward movement of lever 47. However, since the arm K had rotated an arcuate distance greater than the spacing 81 between the ears, the full return stroke will be in excess of the regular return stroke and thereby bring edge 80 into contact with the finger 91 of the spring, this time urging the finger in a clockwise rotative direction (FIGURE 6) to wrap tightly about the member I and thereby screw or threadably advance the member within the socket H. Since the threads are of the left-hand design, the advanceable member I will be unscrewed from the socket and thereby lengthen the distance 95 between the pin 69 and the end of the lever 70 sufficient to return the next subsequent forward stroke of the clutch to its original predetermined movement.

Certain basic advantages are apparent from the above operative wear compensating means W which includes a more economical and simple device in that it is primarily comprised of three elementary parts, the coaxial members H and I and and the friction drive means J. Both the pedal effort is reduced and the pedal or lever stroke is maintained uniform, both advantages obtained simultaneously by the incorporation of the same structure. In the system of the preferred embodiment, only a comparatively light hold-down spring 49 is necessary and may be positioned moderately close to the lever pivot 48. For purposes of exemplification, the preferred embodiment has utilized a light spring 49 provided with a line of action moderately close to the pivot 48; straps 36 are employed having a spring rate and geometrical positioning which will afford a bearing preload of 6-12 pounds as urged against the lever G. The uniform maintenance of lever stroke is an important convenience to an operator in that he does not have to adjust his driving technique to accommodate changes in the clutch system as wear occurs. Furthermore, the ability of the system to automatically take up wear, eliminating any necessity for manual adjustments and also permitting the vehicle owner to insure that the clutch system is properly set by merely pumping on the clutch lever, is unique.

In the event of replacing the clutch for repair, the compensating means W can be reused from the old clutch by merely removing or unscrewing the threaded member I from the member H and then turning the coiled one-way spring J off of the inner end of the threaded member I. The coiled spring may then be reassembled upon the threaded member by slipping it first over the end 89 to the original position as it had when first assembled. The wear adjuster assembly may then be simply placed back upon the connecting pin 69 and slipped into engagement with the operating lever G and subsequent actuation of clutch pedal will automatically properly position wear compensating means W.

One safety feature of this device is the ease of provision of a limit to the amount of wear adjustment that may be experienced. In the conventional type clutches, continued operation of the adjuster, after full wear, would result in scored flywheels or drive plates as a result of rivet heads being exposed. The facing or friction material itself may become so thin that it can be torn or ripped off of the supporting member. The same damage, naturally, can occur with the type of clutch disclosed in the preferred embodiment herein. In addition, the adjustments might continue until such time that the adjustable member I is fully unscrewed from the member H and actually forced out of the body and consequently the wear compensating means will come apart. In other words, the linkage would not even have a pushing element for actuating the lever G.

Figure 9:
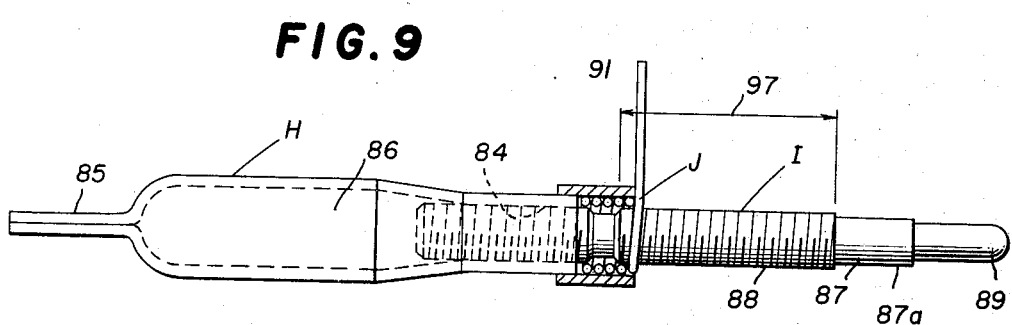
FIGURE 9 is a view similar to that of FIGURE 7, but showing the structure in the fully adjusted condition equivalent to a fully worn clutch facing wherein the wear adjuster will slip in both rotative directions.
Figure 8:
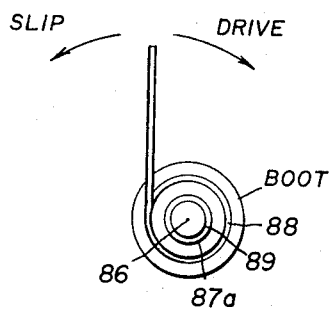
FIGURE 8 is an end illustration of the structure shown in FIGURE 7.

As shown in FIGURES 7-9, the preferred embodiment employs an advanceable member I having the threads interrupted at an intermediate portion 96. Thusly, when the spring has adjusted the advanceable member to a position as shown in FIGURE 9, wherein a lesser number of coils (here two) of the spring remain engaged with the continuous threads 88 of the advanceable member, the friction therebetween will not be sufficient to permit the spring to lock thereabout even during the return stroke of the rocker plate when wear has occurred.

Figure 10:
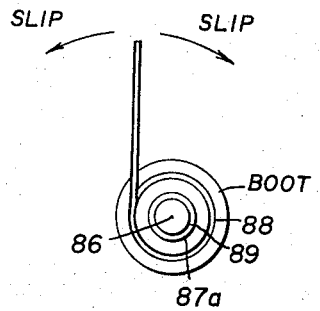
FIGURE 10 is an end elevational view of the structure of FIGURE 9.

The interruption of the threads on the advanceable member I is spaced from the beginning portions of the threads a distance 97 so that the extent to which the advanceable member may be unscrewed from the socket will be commensurate with an acceptable wearing life of the friction facings 38. When the limit condition is reached, the spring will no longer be capable of driving in the clockwise direction as schematically illustrated in FIGURE 8, but will slip in both rotative directions as schematically illustrated in FIGURE 10.

By proper fit of the coiled springs J and the thread diameters, the springs will slip in both rotative directions when no more than two full coils are in engagement with the threads. Consequently, there will be insufficient friction (wrapping down) of the spring to drive the threaded member I and further adjustment will not occur. With properly controlled dimensions and thread lengths, the safety feature can be brought into operation before the previously mentioned damage occurs. When the full facing wear adjustment has been experienced, the wear adjuster W will serve merely as a push rod from that point on. The operator would then have an opportunity to sense a further resulting rise in the clutch pedal if further wear should appear beyond that point. The rising clutch pedal will be a further signal for clutch replacement.

Figure 11:
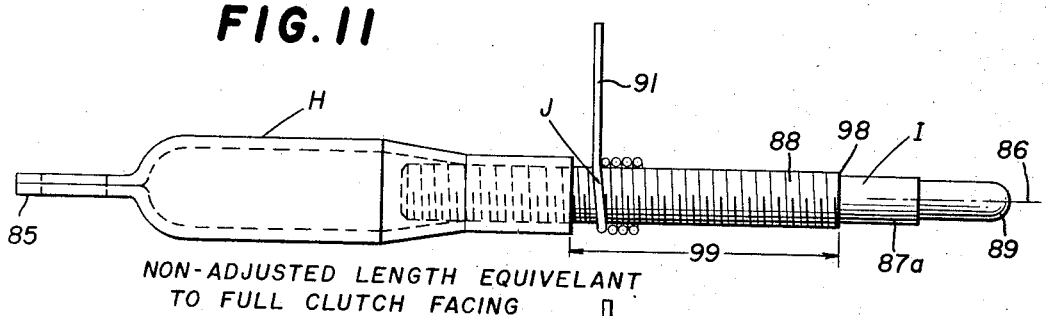
FIGURE 11 is a view like that of FIGURE 7, illustrating an alternative means for providing a limit to the wear adjuster which is adapted for a retractable type thrust rod.
Figure 13:
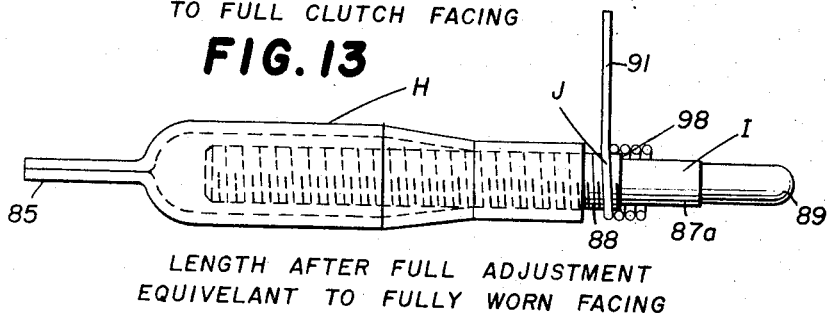
FIGURES 12, 13 and 14 are views similar to FIGURES 8, 9 and 10, but related to the structure of FIGURE 11.
Figure 12:
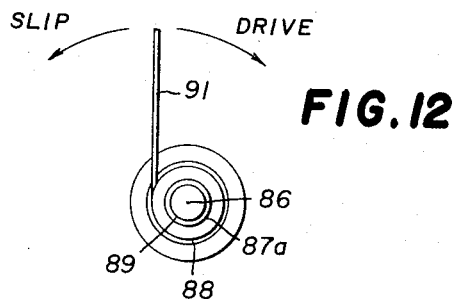
Figure 14:
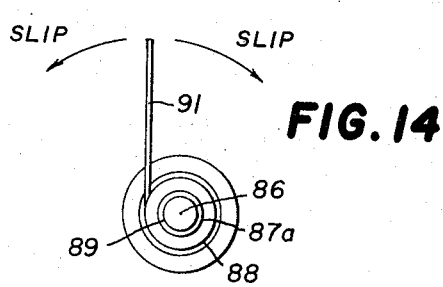

Another manner of providing said full wear safety limit is illustrated in FIGURES 11-14, wherein the coaxial members H and I are adapted for a system whereby they are adapted to be inter-screwed together to shorten the distance between the end of the lever G and the pin on the rocker plate as energized to accommodate wear. In this case, the terminal end portion 98 of the threads which is exterior to the socket is arranged in the unworn condition of the device to be spaced a predetermined distance 99 from the left-hand positioning of the spring, as shown in FIGURE 11. Upon the occurrence of full adjustment equivalent to a fully worn facing, as shown in FIGURE 13, the spring will have adjusted to a position wherein only a limited number of coils (here two) of the spring are in engagement with the threads. This then creates a situation where slip will occur in both rotative directions as schematically shown in FIGURE 14, terminating the condition where drive will be effectuated when the finger is moved in the clockwise direction as schematically illustrated in FIGURE 12.

Turning now to another feature of this invention, depicted in FIGURES 15-18, the rotatively stationary member H of the preferred embodiment wear adjuster, is a product of unique manufacturing steps. Stock sized tubing 100 composed of a workable metal such as copper plated steel (the original cylindrical tubing in its original shape being shown in broken outline in FIGURE 15), is first given a necking-down operation wherein a portion 83 of the tube is reduced in diameter along an axial extent 101 predetermined to form the threaded socket portion 84 for inter-engaging the adjustable member I the degree of necking-down is determined by placement of a form pin 102 temporarily therein.

Figure 17:
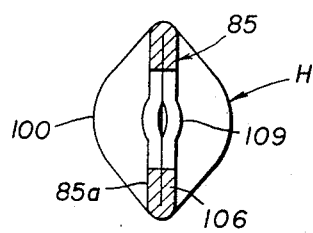
FIGURE 17 is an end view of the completed socket of FIGURE 16 taken along line 17—17 thereof.
Figure 18:
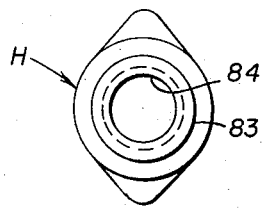
FIGURE 18 is an end view of the completed socket portion taken substantially along line 18—18 of FIGURE 16.

The socket member H is then placed in a fixture 103 adapted to snugly receive the exterior surface 104 of the originally formed tube so that a stamping operation is performed on the other end 105 of the tube sufficient to fold the walls 106 of said tube end into a common plane as shown in FIGURE 17. At the time of forming the end 105 into the flange 85, a D-shaped opening 107 is punched, providing an anti-friction longitudinal edge 108 against which the pin 69 of the linkage may contact and roll. A dimple 109 may then be formed in edge 108 by upsetting a localized spot thereof which will afford a general point contact between a side 85a of flange 85 and the adjacent rocker plate 51 with which it is interconnected to avoid possible scrubbing action.

With the ends or portions 83 and 105 of the tube formed, threads 84 are tapped on the interior wall of the necked-down portion 83 to form the threaded socket. The initial diameter of the tube is chosen to meet the requirements under which it will be used, such diameter being sufficient to enable the tapped threads to transmit the axial force to be countered by the linkage system and sufficient also to permit the inter-screwed formed threads of members H and I to have adequate and not excessive friction therebetween which may be overcome by the disengaging force when actuating said wear adjuster.

Depending upon the positioning of the wear adjuster means relative to the vehicle, some weather protection may be desirable. As shown in the preferred embodiment, enlarged in FIGURES 5a, 7 and 9, a one-piece tube 111 of shrinkable material is placed over the outer surface of the necked-down portion 83 of the socket member H and is adapted to overlie the outer periphery of the coiled spring 92. Upon subjecting the tube 111 to a sufficient temperature condition, the tube will tend to shrink inwardly and provide a contour fit to protect the mechanical elements against contamination. By pre-coating the exterior of the mechanical elements to be covered, before installation, with a release agent (the release agent being a material which prevents binding and seizure of the tube with any other member against which it may be moved) the shrunken tube will travel with the spring and slip on the socket portion and threaded member I during the cocking or adjusting operation experienced during forward or engaging movement of the linkage. Another and preferred manner is to employ grease on the coil spring which will not only seal the air space between the tube and the spring but also aids in reducing friction therebetween so that covered parts may operate while protected.

Figure 19:
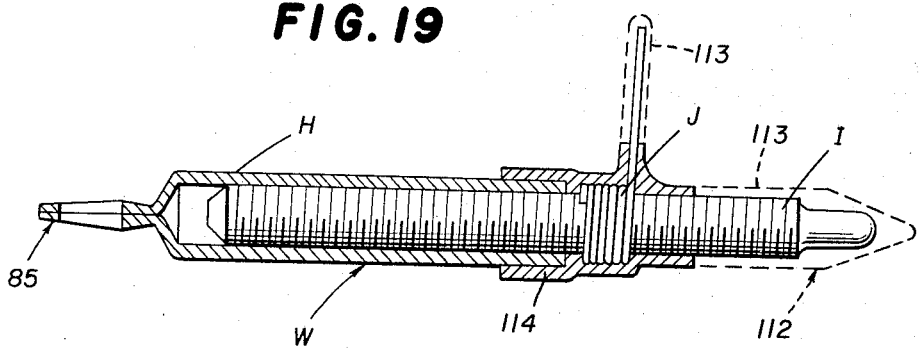
FIGURE 19 is a sectional view of an alternative embodiment of the wear compensating means in FIGURE 4 and illustrating an alternative boot effective to surround the adjusting spring and which is formed from a dipped process.
Figure 15:
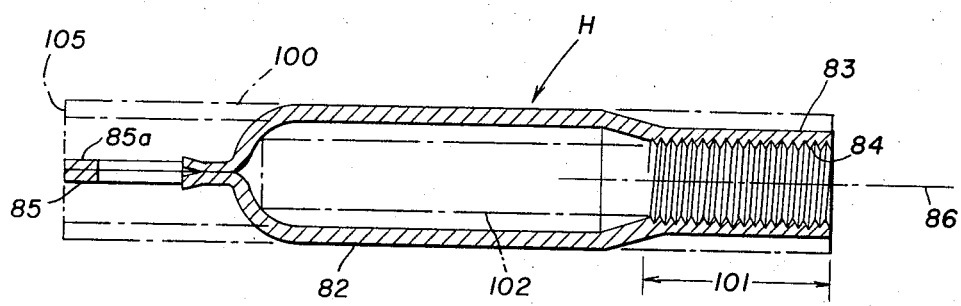
FIGURE 15 is a greatly enlarged view of the socket portion of the wear-compensating means of FIGURE 4, and illustrating a manufacturing fixture and tubing configuration before certain operations.
Figure 16:
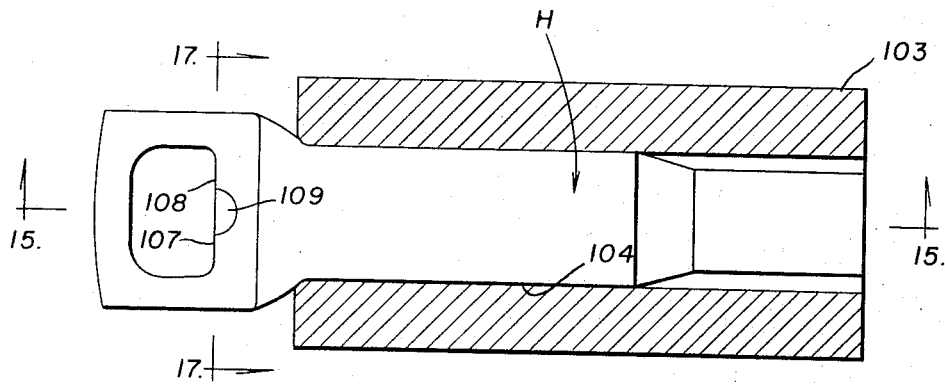
FIGURE 16 is a side view of the socket portion of FIGURE 15 and illustrating a sleeve fixture in section used for forming a subsequent operation of said socket.

Another form of weather protection may be as shown in FIGURE 19, wherein the assembled wear adjuster is held by the tanged flange 85 and dipped into a vat of formulated molten dip material, such as plastic or a wax base material. That portion of the wear adjuster means dipped within material will have a coating 112 as shown in FIGURE 19. Excess material 113 (shown in broken outline) of the plastic may then be removed after it hardens so that a contoured weather boot 114 will appear as shown in cross-section in FIGURE 19. Although FIGURE 19 shows an annular lip extending between the inner end of the spring and the end of the socket member, such lip should be spaced from the socket end on assemblage by slightly unscrewing the boot affording freedom for the spring to cock and adjust. By pre-coating the contacting portions of the wear adjuster assembly with a release agent, the formed boot will travel with the spring and rotate about the socket portion during the cocking operation, or a grease may be employed to serve as an anti-friction agent and as a sealer.

In addition to the safety features above described of the preferred embodiment, there are significant advantages which accrue to the assembler in the manufacture of vehicles employing such clutch systems. For example, considerable calibration and adjustment of conventional clutches has always been a necessity; there have been many times when the assembly line operators have not been able to precisely and quickly adjust the clutch systems by their tools before the vehicle had passed their particular station. Such vehicle had to be withdrawn from the assembly line and placed in a special work area to complete such progress. With the system of this invention, assemblers on a production line can very simply adjust the device by pumping on the pedal 47 within the vehicle until the adjustment means W reaches its proper position. There is no guess work, no delicate calibration and setting required; unskilled assemblers will achieve a properly adjusted clutch each and every time. Furthermore, in the event the assemblers are unable to do even this quick pumping action it will automatically be accomplished during the first few actuations of pedal 47 while driving the vehicle.

The versatility of the wear adjuster system of this invention becomes apparent by examining alternative embodiments disclosed in FIGURES 2 and 3. There has been a long-felt want for a simple wear adjusting design which would sense the change in backlash of a thrust bearing assembly 72 employed upon clutches for the last several decades, and then compensate for facing wear. In many conventional clutches, the thrust bearing assembly employed would actuate a plurality of levers to retract a pressure plate irrespective of the type of engaging force employed (whether a plurality of coiled springs, a Belleville diaphragm, or other structure). Workable models were made but their complexity and cost have been disappointing.

In the embodiment of FIGURE 2, the clutch construction is one where similar parts to that of the preferred clutch are identified by similar numbers, but the engaging means rather than being from a remote spring 46, is provided by an internally disposed Belleville diaphragm 120 acting between the cover plate 32 (formerly a part of the input means) and shoulders 121 formed upon the pressure plate and having an inner periphery 122 contracted by the bearing assembly 72 to urge the diaphragm toward a flat condition during disengagement. In contrast to the system of FIGURE 1, wherein the internal levers 73 and operating fork G as well as the bearing assembly 72 are linked in series with the engaging means D-1 to normally have no backlash as wear occurs, the system of FIGURE 2 has the entire linkage between pressure plate and the release lever 47 in part independent of the engaging force.

Therefore, the engaging force will not necessarily tend to eliminate such backlash. To obviate this problem, a hold-down spring 49 is reversed from its normal disposition in conventional clutches, and adapted to hold the clutch lever 47 in a downward bias which in turn urges the linkage E toward the pressure plate for disengagement. The bearing assembly 72 is then provided with a bearing preload of 6–12 pounds for the system embodiment of FIGURE 2. The rate in geometry of the spring 49 is intended to assist the pedal or lever 47 effort, but will have increasing effect toward the bottom of the lever 47 stroke for the plurality of coiled spring type as disclosed in the embodiment of FIGURE 3. The spring 49 can be more effective with less load than an "over-center" spring, suggested by the prior art because it starts helping right from the beginning of the disengaging stroke instead of resisting for the first portion of travel. In this system, when wear occurs between the friction elements B and C, the bearing assembly must move in a rightward direction as viewed in FIGURE 2 in order to take up any slack (in the systerm of FIGURE 1, such bearing assembly 72 would move in a leftward direction to permit the pressure plate to move more closely toward the other friction element C). Accordingly, the wear adjuster, if interposed in the linkage of FIGURE 2, must have inter-screwed coaxial members which contract as wear occurs rather than expand as in the system of FIGURE 1; to this end the thread direction is reversed from that of FIGURE 1. As the actuating arm K is pivoted counter-clockwise (about pivot axis 52) during the disengaging stroke of the linkage E, the spring finger 91 will be contacted by ear 77 as shown in the bottom portion of FIGURE 2b and pivoted counter-clockwise or upwardly (FIGURE 2b) to slip the spring about the adjustable member I in response to wear. Upon relief of the disengaging means D-2, the cooperation of the Belleville spring, internal retraction straps 36 (not shown) will urge the linkage E back to its initial starting position and pivot the actuating arm K clockwise (FIGURE 2) bringing ear 78 into contact with the spring finger 91 urging the finger clockwise as viewed in the upper portion of FIGURE 2b. The spring will thus be locked about the adjustable member and drive it so as to screw inwardly into the socket member H. The linkage of the system in FIGURE 2 may have a conventional pantograph of mechanical elements, one of the elements carrying the arm K.

The same operation of the linkage system and effect is applicable to a second alternative system as shown in FIGURE 3, similar parts to FIGURE 1 having similar reference numerals, wherein the engaging means D-1 of the clutch is the conventional plurality of circumferentially spaced coiled springs 125 acting axially between the cover plate 32 and the pressure plate 35. In this system, the linkage E comprises a conventional pantograph as in FIGURE 2 and here is completely independent of the engaging springs 125; the linkage E contacts the pressure plate 35 directly by the plurality of internal levers 126 which are pivotally mounted on eye bolts 127 supported on the cover; each lever has a radially outer end 128 which contacts a nose 129 formed on the cover plate 32. The hold-down spring 49 again urges the lever 47 in a downward bias. The operation of the wear adjuster W is the same with respect to arm K as in the system of FIGURE 2.

Turning now to FIGURES 20 and 21 there is shown an alternative embodiment for wear compensating means W which is characterized by a rotatably fixed stud 200 and an adjustable socket member 201; the compensator W comprises a machined steel cylinder 202 having one end provided with a connecting tongue 203 including a D-shaped opening 204 effective to interengage with a pin 205 attached to the rocker plate of the described system in FIGURE 1 and extending therethrough; the upper and lower sides 206 and 207 respectively of the tongue are biased to eliminate scrubbing. The cylinder 202 is provided with a cylindrical bore 208 rotatably receiving a threaded socket member 201 having a cylindrical section effective to nest within said bore 208; the threaded socket member has an annular shoulder 209 adapted to abut the terminal end 210 of the connecting socket 202 and has a cylindrical drum surface 211 adjacent the shoulder. The opposite end 212 of the threaded socket member 201 is provided with a stepped down cylindrical surface 213 for receiving a sleeve 214 thereon. The sleeve 214 is provided with a reduced drum surface 215 adapted to be in coaxial alignment and aligned with the drum surface 211 of the threaded socket member 201 and is arranged to lie in a contiguous relationship therewith; the sleeve 214 has a radially extending finger 215 adapted to be rotatably energized about the common axis 217 for operating the wear adjuster. The sleeve 214 is maintained in an axial position on the threaded socket member by a snap ring 218 received in a groove 219 at the end 220 of the threaded socket member. A housing 221 is provided to surround the assembly consisting of the connecting socket 202, threaded socket member 201 and sleeve 213 and is provided with a neck portion 222 adapted to be mounted upon the connecting socket 202.

The threaded stud 200 is received within the threaded socket member 201 and extends through the housing through an opening 224 therein; the threaded stud 200 is provided with a spade portion 225 at the outermost end thereof which is received within a slot 226 formed on the operating fork G and is prevented against rotation about its own axis while inter-engaged with said operating fork; the threaded stud may be considered a fixed member with reference to the wear adjuster means W.

A helically coiled friction band 227 is mounted about the drum surface 211 and 215 and is arranged so that rotation of the sleeve 214 in one rotative direction (as viewed in FIGURE 21) is effective to more tightly wind the band 227 against the drum surfaces providing conjoint movement therebetween and thereby rotating the threaded socket member with reference to the rotationally fixed stud. Such relative movement unscrews the threaded stud from the socket member and lengthens the connecting extremities of the wear adjuster means. Rotation of the sleeve in the opposite rotative direction tends to uncoil the helical band releasing any driving connection between the threaded socket member and the sleeve 214. The energization of finger 215 is the same as described for the embodiment of FIGURE 1.

Turning now to FIGURES 22–25, there is illustrated yet another alternative embodiment of the wear compensating means having a stepped adjustment. In this arrangement, the linkage means E comprises a resilient means or spring 250 connected to an upper portion 251 of a rocker plate 252 (the connecting structure being similar to that in FIGURE 1) and is operatively moved with a decreasing moment arm 253 about pivot 254; a flexible strand 255, forming part of the linkage means connecting with the manual means (not shown) is connected to the rocker plate at the lower extremity 257 thereof and generally maintains the moment arm 258 uniform as the plate is pivoted between extreme movements. The connection of the wear adjuster W to the rocker plate is to a position 259 generally intermediate the connections of the manual and resilient means and is designed so that the moment arm 260 increases as the clutch is more fully disengaged.

The wear adjuster means W here is of the type employing a ratchet wheel 261 and a resilient finger or indexer 285 which indexes within teeth 263 provided on said ratchet wheel; this arrangement provides for more positive stepped increments in wear adjustment and is resistant to failure from contamination by dirt. The wear adjuster means broadly comprises a connecting journal member 264 having one end 264a fixed against rotation about its axis 265 and is provided with a flat tongue 266 within which is defined a generally D-shaped opening 267 for receiving a cylindrical pin 268 (attached to the rocker plate 252) extending therethrough. The connecting journal member 264 has a central bore 269 extending inwardly from end 270 and having a diameter larger in dimension than a threaded stud 271 which is stored within said journal member bore 269; there is no threaded connection between the journal member and the threaded stud. Ratchet wheel 261 has a threaded socket 272 threadably disposed on a stud 271 and cooperates in defining the coaxial members H and I which are characteristic of this type of wear adjuster. The ratchet wheel 261 has a plurality of teeth 263 formed thereon, each tooth having a generally radially directed surface 263a and a side defined by a biased surface 263b.

The one-way device in this embodiment comprises a rotatable bracket 273 having a body portion which is generally radially directed and provided with a central opening 275 through which extends the neck 275 of the connecting journal member 264. The bracket 273 has a finger 276 extending radially outwardly through the housing 277 surrounding the wear adjuster (the housing has a neck 278 upon a portion of the connecting journal member 264). The housing 277 has a slotted opening 279 effective to permit said finger 276 to move arcuately therein. The finger 276 is actuated by arm K coupled to the rocker plate 252; arm K has arcuately spaced ears 280 and 281, ear 280 having a surface 282 effective to engage the finger 276 upon excessive clutch engagement to cock the finger for adjustment for wear. Ear 281 carries a surface 283 effective to engage the finger 276 upon excessive clutch disengagement to adjust said ratchet wheel.

The bracket 273 further comprises an arm 284 extending generally parallel to the axis 265 of said journal member and spaced radially outwardly therefrom effective to overlie the teeth of said ratchet wheel 261. The arm 284 carries a resiliently urged indexer 285 having one end 286 provided with an opening 287 effective to receive a pin 288 which is secured to the arm 284 of the bracket. A coiled compression spring 289 is disposed about said pin 288 and has one end 289a engaged with the head 288a of the pin and an opposite end 289a engaged with the indexer 285; the spring is effective to urge the indexer into a position so that the end 290 engages the roots of the teeth on the ratchet wheel. Upon rotation of the bracket, the indexer is urged to tilt so that the end 290 may ride up and over the tops of the teeth of the ratchet wheel causing end 286 to compress one side of the coil spring 298 (as seen in FIGURE 24.)

To prevent the ratchet wheel from unintentionally rotating in a direction opposite to that desired for advancing the threaded stud 271, as may be caused by vibration from road movements, a resilient clip 292 is employed having a pair of split feet 293 effective to extend about the neck 275 of the connecting journal member 264 for mounting and has a resilient tail 294 bent outwardly from the plane of said feet effective to stabilize the clip. The clip also is provided, at a radially outwardly spaced position, a resilient tongue 295 effective to overlie and inter-engage with the teeth of the ratchet wheel 261. As the ratchet wheel is turned in an advancing direction, the resilient tongue 295 is sprung outwardly and rides up and over the teeth ridges. However, upon turning of the ratchet wheel in an opposite direction, the resilient tongue will lock against the surface 263a of an inter-engaged tooth and prevent such movement. The resilient tongue 295 engages the ratchet wheel at a position diametrically opposite from that at which the indexer 285 engages the ratchet wheel.

For operation of the wear adjuster of the embodiment of FIGURES 22–25, a definite increment of wear must take place before the wear adjuster will take up the slack caused thereby. The wear must be of such degree so that the finger 276 is rotated sufficiently to cause the indexer 285 to jump from one tooth root to the next during the engaging operation whereby upon a clutch disengaging operation the wheel will be rotatably driven the increment of one tooth causing the stud 271 to unscrew and extend the linkage. The indexer cannot jump from tooth to tooth in a direction opposed to surface 263a, but can move from tooth to tooth by moving in a direction which rides up upon surface 263b of each tooth.

While we have described our invention in connection with one specific embodiment and other alternative suggestions thereof, it is understood that these are by way of illustration and not by way of limitation and the scope of our invention is defined solely by the appended claims which should be construed as broadly as the prior art will permit.

We claim:

1. A friction device comprising means having interengageable friction elements arranged to be moved through a predetermined distance with respect to each other from a disengaged position to an engaged position; actuating means effective to move at least one of said friction elements through said predetermined distance to cause engagement and disengagement of said friction elements and effective to move at least one of said friction elements through a distance in excess of said predetermined distance upon occurrence of wear of either of said friction elements; said actuating means including as a lever portion thereof two coaxial telescoping members both movable with said actuating means together defining a portion of a lever having an effective length; said two coaxial members being relatively rotatable with respect to each other and adjustment means operatively connected between said coaxial members whereby relative rotation therebetween causes the effective length thereof to change; said adjustment means including a one-way means interposed between said two coaxial members being effective to restrict relative rotation between said two coaxial members as said actuating means moves said friction elements through said predetermined distance and being effective to cause relative rotation between said two coaxial members as said actuating means moves at least one of said friction elements through said distance in excess of said predetermined distance whereby the effective length of said two coaxial members changes to compensate for wear of said friction elements.

2. A combination employing a friction device as in claim 1, in which said one-way means particularly comprises a helical spring wrapped about one of said coaxial members and having a portion thereof responsive to excessive movement of said friction elements beyond said predetermined distance and effective to be energized in one direction for locking said helical spring about said one member and for insuring a slip condition between said spring and one member when energized in an opposite direction.

3. A combination employing a friction device as in claim 1, in which said one-way means comprises a helical spring wrapped about one of said coaxial members and having a portion thereof responsive to excessive movement of said friction elements a distance in excess of said predetermined distance and effective to be energized in one direction for locking said helical spring about said one member and effective to be energized in the opposite direction for insuring a slip condition between said spring and said one member.

4. A combination employing a friction device as in claim 1, in which said coaxial members of said actuating means comprises: a socket held against rotation about the common axis thereof and a threaded stud threadably received in said socket and adapted to be threadably advanced relative to said socket by said helical spring, said threads being defined by at least two converging surfaces, and said springs being comprised of a continuous strand engaged with opposite surfaces of adjacent threads whereby upon energization of said springs in said rotative direction for locking said springs said surfaces of said threads aid the locking action of said helical spring with said stud.

5. A combination employing a friction device as in claim 4, in which said friction drive means is provided with an adjusting limit by spacing said terminal portions of said continuous thread a distance apart proportional to a predetermined degree of wear to be experienced by said friction elements, whereby said helical spring is effective to slip in both directions when said predetermined degree of wear is experienced.

6. A combination employing a friction device as in claim 4, in which said helical spring has one end thereof formed with a finger extending transversely outwardly therefrom, and said linkage comprises an actuating arm carrying a pair of spaced ears, said arm being mounted for movement in a plane transverse to said finger and adapted for movement in direct proportion to the movement of said friction elements for engagement and disengagement, said ears being spaced apart a distance porportional to said predetermined distance through which said friction elements are moved to provide complete inter-engagement whereby upon the occurrence of wear between said friction elements one of said ears engages said spring finger to slip said friction drive means about said threaded stud a proportional amount during disengagement of said friction elements, and the other of said ears engages said spring finger effective to lock and drive said friction drive means about said stud during engagement of said friction elements to advance said members relative to each other and thereby adjust said linkage to compensate for wear.

7. A combination employing a friction device as in claim 6, in which said spring finger is directed tangentially outwardly from the helical configuration of said spring.

8. A combination employing a friction device as in claim 3, in which said coaxial members of said friction drive means comprises: a socket held against rotation about the common axis thereof and a threaded stud threadably received in said socket and adapted to be threadably advanced relative to said socket by said one-way helical spring, said threads being defined by at least two converging surfaces, and said spring being comprised of a continuous strand engaged with opposite surfaces of adjacent threads whereby upon energization of said spring in said rotative direction for locking said spring said surfaces of said threads and said spring interlock to cause rotation with said stud with respect to said socket.

9. A combination employing a friction device as in claim 8, in which said friction drive means is provided with an adjusting limit by spacing said terminal portions of said continuous thread a distance apart proportional to a predetermined degree of wear to be experienced by said friction elements, whereby said helical spring is effective to slip in both directions when said predetermined degree of wear is experienced.

10. A combination employing a friction device as in claim 8, in which said helical spring has one end thereof formed with a finger extending transversely outwardly therefrom, and said linkage comprises an actuating arm carrying a pair of spaced ears, said arm being mounted for movement in a plane transverse to said finger and adapted for movement in direct proportion to the movement of said friction elements for engagement and disengagement, said ears being spaced apart a distance proportional to said predetermined distance through which said friction elements are moved to provide complete inter-engagement whereby upon the occurrence of wear between said friction elements one of said ears will engage said spring finger to slip said friction drive means about said threaded stud a proportional amount during engagement, and the other of said ears will engage said spring finger effective to lock and drive said friction drive means about said stud during disengagement to advance said members relative to each other and thereby adjust said linkage to compensate for wear.

11. A combination employing a friction device as in claim 2, in which said coaxial members of said friction drive means comprises: a socket held against rotation about the common axis thereof and a threaded stud threadably received in said socket and adapted to be threadably advanced relative to said socket by said one-way helical spring, said threads being defined by at least two converging surfaces, and said springs being comprised of a continuous strand engaged with opposite surfaces of adjacent threads whereby upon energization of said springs in said rotative direction for locking said springs said surfaces of said threads aid the locking action of said helical spring with said stud.

12. A combination employing a friction device as in claim 11 which said helical spring has one end thereof formed with a finger extending transversely outwardly therefrom, and said linkage comprises an actuating arm carrying a pair of spaced ears, said arm being mounted for movement in a plane transverse to said finger and adapted for movement in direct proportion to the movement of said friction elements for engagement and disengagement, said ears being spaced apart a distance proportional to said predetermined distance through which said friction elements are moved to provide complete inter-engagement whereby upon occurrence of wear between said friction elements one of said ears will engage said spring finger to slip said friction device means about said threaded stud a proportional amount during engagement, said the other of said ears will engage said means about said stud during disengagement to advance said members relative to each other and thereby adjust said linkage to compensate for wear.

13. A combination employing a friction device as in claim 11, in which said friction drive means is provided with an adjusting limit by spacing said terminal portions of said continuous thread a distance apart proportional to a predetermined degree of wear to be experienced by said friction elements, whereby said helical spring is effective to slip in both directions when said predetermined degree of wear is experienced.

14. A combination employing a friction device, comprising: friction means having inter-engageable friction elements arranged to be moved through a predetermined distance for establishing complete inter-engagement thereof: means effective to normally apply an engaging force to one of said friction elements for promoting said complete inter-engagement of said elements; a manually operated lever means having a fixed pivot; linkage means operably inter-connecting said lever with said one friction element and including resilient means opposed to said engaging means which normally urges said lever in a pivotal direction for effecting disengagement of said one friction element from the other element; and compensating means interposed as a part of said linkage means effective to sense movement of said one friction element beyond said predetermined forward stroke, said compensating means comprising coaxial inter-screwed members and a coiled spring wrapped about the threaded exterior of one of said members, said spring effective to be adjusted by said linkage during the engaging stroke of said friction elements when wear occurs and effective to be locked when rotated in an opposite direction by said linkage during the disengaging stroke of said friction elements whereby said members are moved relatively to compensate for the precise degree of wear that has been experienced.

15. A combination employing a friction device as in claim 14 in which said linkage means comprises a plurality of rockable levers arranged in series relationship effective to be moved through predetermined angular strokes for promoting disengagement of said device.

16. A wear compensating device, comprising: a pair of coaxial inter-screwed members, one member being held against rotation about the axis thereof and the other member adapted to be advanced threadably with respect to the other member; a helical spring mounted about said advanceable member and effective to be energized in one rotative direction for slipping about said advanceable member in response to a degree of wear and effective to be energized in an opposite rotative direction for driving said advanceable member with respect to the other member; and protective means substantially surrounding adjacent portions of said members and said one-way spring, said protective means being shrunk about the outer contours of said members and spring to form a dirt-tight barrier thereabout.

17. A wear compensating device, comprising: a pair of coaxial inter-screwed members, a first member being held against rotation about the axis thereof and a second member capable of being threadably adjusted with respect to said first member; a helical spring mounted about said second member and effective to be energized in one rotative direction for slipping thereabout in response to a degree of wear and effective to be energized in an opposite rotative direction of locking about said adjustable member and imparting drive thereto to move said adjustable member relative to said fixed member and compensate for said degree of wear; and an elastic encapsulate substantially surrounding adjacent portions of said members and said one-way spring and effective to hug the outer contours of said members, said encapsulate sealingly receiving one end of said spring extending therethrough for being energized.

18. A wear compensating device as in claim 17, in which a lubricant is coated on the exterior of said members and spring permitting said spring to rotate relative to said protective means and providing a seal therebetween.

19. For use in a clutch-opearting system employing mechanical linkage movable through predetermined forward and return strokes for providing clutch engagement and disengagement, a wear compensating means, comprising: a pair of coaxial interscrewed members, one member being held against rotation about the axis thereof and the other member capable of being threadably adjusted relative to said first member, a helical spring wrapped about and intermeshed with the threads of said adjustable member and having a terminal end portion extending transversely outwardly therefrom effective to be energized in one rotative direction for slipping about said adjustable member in response to excessive movement of said linkage caused by wear and effective to be energized in an opposite rotative direction for locking about said adjustable member in response to excessive movement of said linkage during the return stroke caused by wear whereby said adjustable member will be driven relative to said first member for returning said linkage strokes to said predetermined extent.

20. A wear compensating device as in claim 19, in which said adjustable member has threads formed only along a predetermined limited extent thereof predetermined to correspond with the full extent of normal wear to be experienced by the clutch system with which it is used, said spring requiring predetermined surface contact with said adjustable member to drive same, said thread limit thereby preventing said spring to lock and drive said adjustable member when moved to said limit whereby said spring will slip in both rotative directions.

21. A combination employing a friction device, comprising: clutch means having rotative input and output means and including a friction disc drivingly connected to said output means and a pressure plate means coaxial with said friction disc drivingly connected to said input means effective to frictionally clamp said disc for imparting rotative drive thereto, said pressure plate means being effective to be moved axially through predetermined cyclic forward and return strokes to establish complete interengagement of said pressure plate means and disc; means effective to provide an engaging force and normally urging said pressure plate means toward a clutch engaging condition through a predetermined forward stroke; means effective to selectively provide a disengaging force to said pressure plate means and particularly comprising a pivotal pedal employing a hold-down spring normally urging said pedal in a direction for disengaging said pressure plate means; and linkage means inter-connecting said disengaging means with said pressure plate means and movable through a predetermined distance in response to movement of said pedal; and wear compensating means interposed in said linkage means to act as a force transmitting link thereof, said compensating means comprising a pair of coaxial inter-screwed members, one member being held against rotation and the other member being capable of threadably advancing relative to said fixed member and a helically coiled spring mounted about the threaded exterior of said advanceable member effective to be energized in one rotative direction by said linkage means as wear occurs for slipping said spring member about said threaded member and effective to be energized in an opposite rotative direction by said linkage means during the disengaging stroke of said pedal for locking about said advanceable member and driving said advanceable member relative to said fixed member for returning said linkage means and pedal to said predetermined stroke.

22. A combination employing a friction device as in claim 21, in which said engaging means particularly comprises a resilient Belleville diaphragm having portions thereof acting between said rotative input means and said pressure plate means and said inter-screwed members being effective to be screwed toward each other as driven by said spring during the engaging movement of said pedal to adjust for wear.

23. A combination employing a friction device as in claim 21, in which said engaging means comprises a plurality of coiled compression springs each having one end in engagement with said rotative input means and in opposite end in engagement with the pressure plate means and said inter-screwed members being effective to be screwed toward each other as driven by said spring during the engaging movement of said pedal to adjust for wear.

24. A combination employing a friction device as in claim 21 in which said engaging means comprises a resilient spring disposed remotely from said clutch means, said linkage means comprising a pivotal rocker plate having geometrically predetermined portions thereof interconnected with each of said engaging means, disengaging means and said wear compensating means whereby excessive pivotal movement of said rocker plate will actuate said compensating means for adjusting said members relative to each other.

25. A clutching system, comprising: clutching means having axially engageable friction elements, manual means effective to be urged through a predetermined distance for disengaging said friction elements; resilient means normally urging said friction elements through a predetermined distance to provide complete inter-engagement thereof; linkage means interconnecting said manual means, resilient means and clutching means, said linkage means particularly comprising a pivotally mounted rocker plate having one portion thereof connected to said resilient means in a manner so that said plate will be urged in one pivotal direction, another portion of said plate being interconnected with said manual means and adapted to be urged in opposite pivotal direction upon operation of said manual means, and another portion of said plate being interconnected with said clutching means; and wear compensating means interposed in said linkage means between said plate and said clutching means and particularly comprising coaxially aligned members, one member being connected to the plate and the other member being connected with said clutching means, a helical friction band disposed about one of said coaxial members and being responsive to movement of said manual release means beyond said predetermined distance effective to advance said coaxial members apart for returning the movement of said manual release means back to said predetermined distance.

26. A clutch system, as in claim 25, in which one of said coaxial members comprises a screw provided with a stud at one end, said screw being threadably received within the other of said coaxial members; and said helical friction band comprising a helically coiled spring effective to fit about and generally between the thread faces of said screw, said thread faces being disposed at an angle with respect to the direction of radial tightening of said coiled spring thereby augmenting the frictional gripping therebetween by wedging.

27. A clutch system as in claim 25, in which said plate has an arm extending therefrom and has spaced fingers effective to remain spaced from said helical coiled spring when said manual means is traversing said predetermined distance, one of said fingers being effective to engage said helical coiled spring when said manual means traverses a distance in excess of said predetermined distance for energizing said spring to advance said stud.

28. A clutch system as in claim 25, in which said linkage means comprises a clutch operating lever having one end inter-engaged with one of said coaxial members of said wear compensating means, said one coaxial member having a nose received in a pocket on said lever whereby said received coaxial member may rotate relative to said lever while still inter-engaged therewith, the other of said coaxial members having an end portion provided with a D-shaped opening through which extends a cylindrical projection of said plate.

29. A clutch system as in claim 25, in which a semi-elastic tube is disposed about said threaded screw and effective to cover one end of said fixed coaxial member and extend beyond said coiled member, said tube being shrink-fitted thereabout to provide a protective covering, and a lubricant coating the interior of said shrunken tube for preventing bonding and seizure of the tube about said screw and for sealing therebetween.

References Cited

UNITED STATES PATENTS

| | | | |
|---|---|---|---|
| 893,220 | 7/1908 | Anderson | 188—202 |
| 1,125,035 | 1/1915 | Anderson | 188—196 |
| 2,073,705 | 3/1937 | Moorhouse | 192—111 |
| 2,232,302 | 1/1941 | Auten | 192—99 X |
| 2,321,513 | 6/1943 | Reed | 192—99 |
| 2,421,869 | 6/1947 | Brock | 192—111 |
| 3,115,217 | 12/1963 | Butler | 188—72 X |
| 3,117,661 | 1/1964 | Waclawek | 192—111 |
| 3,131,787 | 5/1964 | Swift | 188—196 X |

BENJAMIN W. WYCHE III, *Primary Examiner.*